United States Patent
Maiden et al.

(10) Patent No.: US 9,150,433 B2
(45) Date of Patent: Oct. 6, 2015

(54) DYNAMO POWERED ULTRAVIOLET WATER PURIFICATION SYSTEM

(75) Inventors: Miles Maiden, Blue Hill, ME (US); Costas Papadopoulos, Acton, MA (US)

(73) Assignee: Hydro-Photon, Inc., Blue Hill, ME (US)

( * ) Notice: Subject to any disclaimer, the term of this patent is extended or adjusted under 35 U.S.C. 154(b) by 1148 days.

(21) Appl. No.: 12/986,590

(22) Filed: Jan. 7, 2011

(65) Prior Publication Data

US 2011/0168642 A1    Jul. 14, 2011

Related U.S. Application Data (60) Provisional application No. 61/293,275, filed on Jan. 8, 2010.

(51) Int. Cl.
| | |
|---|---|
| C02F 1/00 | (2006.01) |
| G01T 1/20 | (2006.01) |
| B01J 19/08 | (2006.01) |
| C02F 1/32 | (2006.01) |
| B01J 19/12 | (2006.01) |

(52) U.S. Cl.
CPC ............... *C02F 1/325* (2013.01); *B01J 19/123* (2013.01); *C02F 1/32* (2013.01); *C02F 2201/009* (2013.01); *C02F 2201/322* (2013.01); *C02F 2201/326* (2013.01); *C02F 2307/02* (2013.01)

(58) Field of Classification Search
None
See application file for complete search history.

(56) References Cited

U.S. PATENT DOCUMENTS

| | | | |
|---|---|---|---|
| 4,279,254 A  * | 7/1981 | Boschetti et al. | 607/94 |
| 5,612,852 A | 3/1997 | Leverault et al. | |
| 6,237,653 B1 | 5/2001 | Chaffee | |
| 6,476,311 B1 | 11/2002 | Lee et al. | |
| 7,049,708 B2 | 5/2006 | Hartman et al. | |
| 7,163,312 B2 | 1/2007 | Woodyard | |
| 2005/0109690 A1* | 5/2005 | Bechtold | 210/239 |
| 2005/0258108 A1 | 11/2005 | Sanford | |
| 2005/0279679 A1 | 12/2005 | Baarman | |
| 2008/0084177 A1 | 4/2008 | Sander et al. | |
| 2009/0039032 A1* | 2/2009 | Patera et al. | 210/760 |
| 2009/0039033 A1* | 2/2009 | Kee et al. | 210/760 |
| 2009/0315733 A1* | 12/2009 | Bischoff | 340/659 |
| 2011/0104017 A1* | 5/2011 | Migliore et al. | 422/186.3 |

FOREIGN PATENT DOCUMENTS

| | | |
|---|---|---|
| WO | WO 2004/028290 | 4/2004 |
| WO | WO/2008/062923 | * 5/2008 |

* cited by examiner

*Primary Examiner* — Nam Nguyen
*Assistant Examiner* — Richard Gurtowski
(74) *Attorney, Agent, or Firm* — Cesari and McKenna, LLP (57) ABSTRACT

A system and method for powering an ultraviolet (UV) water purification system utilizing a dynamo. A dynamo, operably attached to the UV water purification system, generates power from a rotatable crank which is actuated by a user around an axis of the rotatable crank. When the crank is rotated, the dynamo produces an electrical current that activates and powers the UV lamp, which in turn, produces UV light to purify the water. To ensure that the water has been purified appropriately, a microcontroller, employed within the UV water purification system, tracks both the "on" time and the intensity of the UV lamp as the dynamo is cranked. Once the lamp has been "on" at a sufficient intensity and for an appropriate period of time to administer a required dose of UV light, the microcontroller disables the lamp and provides the user with notification that the process has completed.

20 Claims, 6 Drawing Sheets

DYNAMO POWERED ULTRAVIOLET WATER PURIFICATION SYSTEM

CROSS-REFERENCE TO RELATED APPLICATIONS

This application claims the benefit of U.S. Provisional Patent Application Ser. No. 61/293,275, which was filed on Jan. 8, 2010, by Miles Maiden for an "Dynamo Powered Ultraviolet Water Purification System" and is hereby incorporated by reference.

BACKGROUND OF THE INVENTION

1. Field of the Invention

This invention relates to a system and method for ultraviolet purification of drinking water in a portable dynamo powered container system.

2. Background Information

Throughout the world, safe drinking water is becoming increasingly less available. This is particularly true in developing third world countries where the populations are growing faster than the technology required to provide access to safe is drinking water. According to a nonprofit group, Water. Org., "[m]ore than 3.5 million people die each year from water related diseases; 84 percent are children."

In order to effectively respond to the growing need for safe drinking water, not only must the technologies be efficient, but they must also be appropriate for the conditions in which the technology is going to be used. In emergency situations, for example, electrical power and the purchase of batteries may be impossible for certain people because of inaccessibility to a local store or market. Even further, power grids may not exist in some parts of developing countries, and, even if the power grids do exist, electrical power may be too expensive to purchase. In such situations, "in-house" water treatment technologies that require electricity (a grid) or batteries are not an option. Accordingly, a water treatment system which does not require electricity or batteries to run would be advantageous.

Currently, there are a number of water treatment technologies that do not require grid or battery power, e.g., chemical treatments, gravity and hand pump filters, boiling, and so forth. While each of these technologies can be beneficial, they each have their own disadvantages.

Chemical treatments often impart an unpleasant taste in the water and could, if not monitored appropriately, be toxic if consumed. Further, the chemical treatments are somewhat complex to administer since factors such as water temperature and volume must be considered when deciding the appropriate effective dosage for these chemicals. Additionally, chemical treatments are time consuming, often taking up to four hours to work. Chemical treatments also incur ongoing expenses because they need to be replenished. This, in turn, requires a supply chain, which may not always be available.

In the case of gravity and hand-pump filtration systems, large microbes can often be eliminated, but viruses and bacteria are generally too small to be removed by this type of system. Certain pump filtration systems also require filter cartridges that may clog if is they become too full. Therefore, the cartridges must be replaced regularly in order to ensure efficiency in the system. Thus, pump filtration systems also suffer from the same supply chain issues as chemical treatment options.

Boiling water can be a good method for treating drinking water. However, boiling water is energy intensive. Thus, some sort of fuel source, such as expensive petroleum products or wood (which is often scarce in these countries) is required. Also, like chemical treatments, there is a significant time delay between beginning a treatment and consumption, sometimes taking up to an hour depending upon the altitude at which the boiling is being done and the time it takes the water to cool to a temperature in which it can be consumed.

Ultraviolet light (UV) purification is an extremely effective method for purifying water and does not suffer from a many of the defects discussed above. It has been used broadly for many years in industrial, municipal, residential, and portable applications around the world. Portable UV light purification systems are further described in U.S. Pat. Nos. 5,900,212 and 6,110,424, both entitled HAND-HELD ULTRAVIOLET WATER PURIFICATION SYSTEM, by Miles Maiden et al., and U.S. Pat. No. 6,579,495, entitled HAND-HELD ULTRAVIOLET WATER PURIFICATION SYSTEM USING SOLID STATE DEVICES, by Miles Maiden, the contents of which are hereby incorporated by reference. Specifically, UV light purification is much faster than chemical treatments and boiling. Furthermore, it can kill viruses and bacteria which gravity and hand pump filters cannot remove from the water, and it does not alter the water's taste and toxicity as chemical treatments do. However, UV purification does require an electrical current to operate, so batteries, a power grid, or generators have been required to operate the system.

SUMMARY OF THE INVENTION

The disadvantages of the prior art are overcome in the current invention by providing a system and method for powering an ultraviolet (UV) water purification system utilizing a dynamo. In particular, a dynamo is operably attached to the UV water purification system disposed in a container or water bottle. Beneficially, the attached is dynamo may generate power from a rotatable crank which is actuated by a user around an axis of the rotatable crank. When the crank is rotated, the dynamo produces an electrical current that activates and powers the UV lamp, which in turn, produces UV light to purify the water. To ensure that the water has been purified appropriately, a microcontroller, employed within the UV water purification system, tracks both the "on" time and the intensity of the UV lamp as the dynamo is cranked. Once the lamp has been on at a sufficient intensity and for an appropriate period of time to administer a required dose of UV light, the microcontroller disables the lamp and provides the user with notification that the process has completed. The dynamo powered UV water purification system provides the user with the many advantages of UV light purification without the need for external power sources or disposable batteries. As such, the presently described system and technique would be ideal for use in emergency situations (e.g., earth quakes, hurricanes, floods, etc.), and/or in developing countries and wilderness areas where power grids are not functional or not in place.

BRIEF DESCRIPTION OF THE DRAWINGS

The invention description below refers to the accompanying drawings, of which.

DETAILED DESCRIPTION OF AN ILLUSTRATIVE EMBODIMENT

The disadvantages of the prior art are overcome in the current invention by providing a system and method for an ultraviolet (UV) water purification system that is powered by a dynamo. Specifically, an operably attached crank may be rotated about an axis of a rotatable crank to produce electrical current which activates and powers a UV lamp within the UV water purification system, which in turn, produces UV light that purifies the water surrounding the UV lamp in a provided container.

Figure 1:
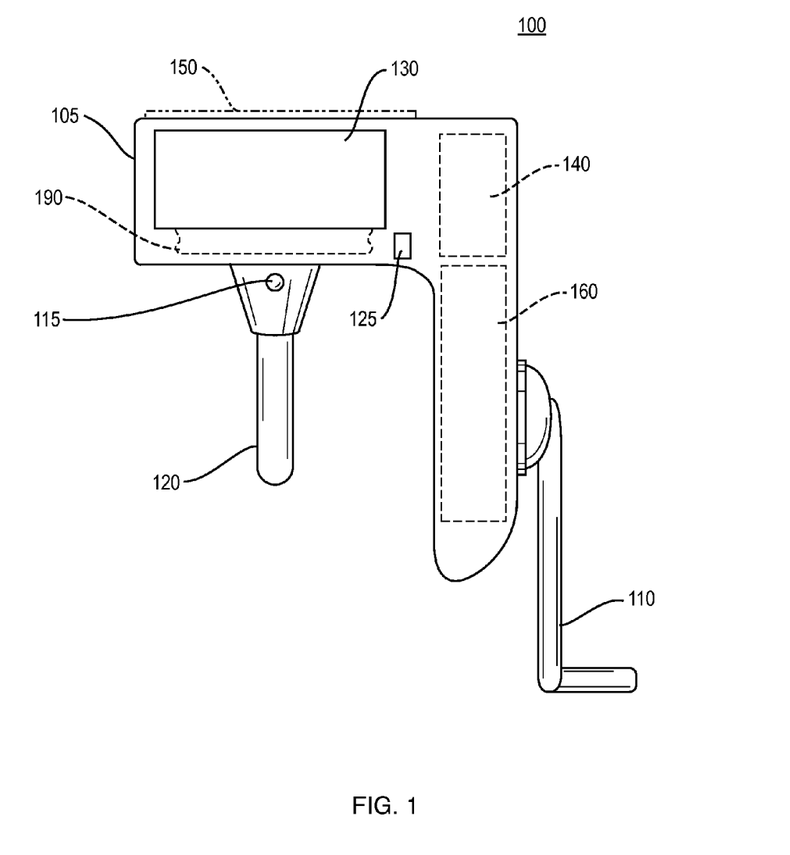
FIG. 1-5 are a schematic diagrams of multiple views of the exemplary UV water purification system that may be advantageously used with the present invention.
Figure 2:
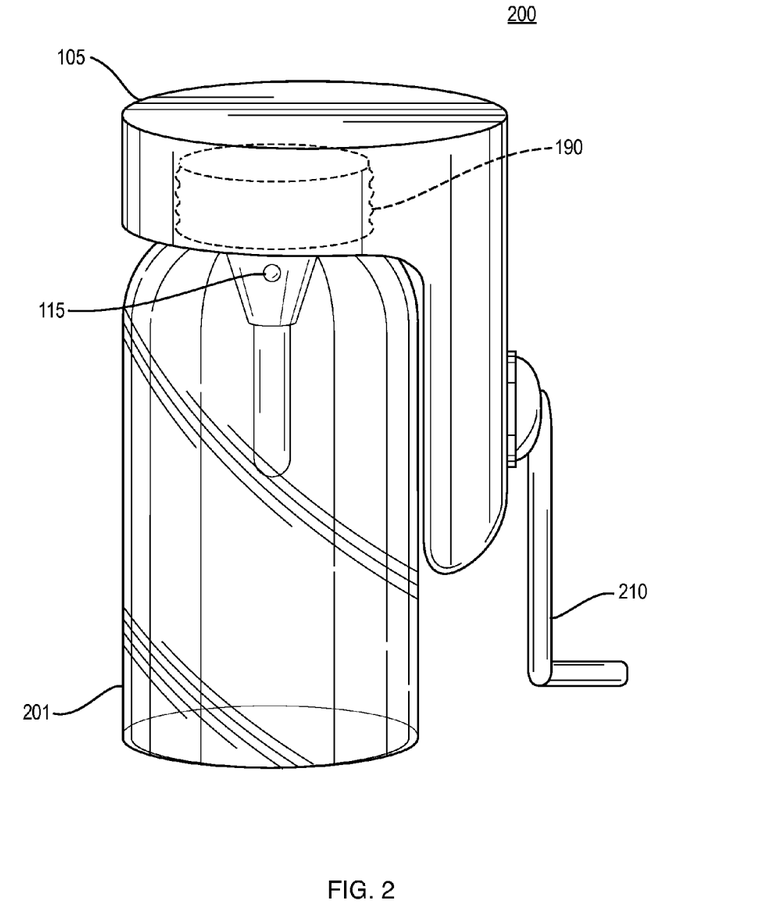
Figure 3:
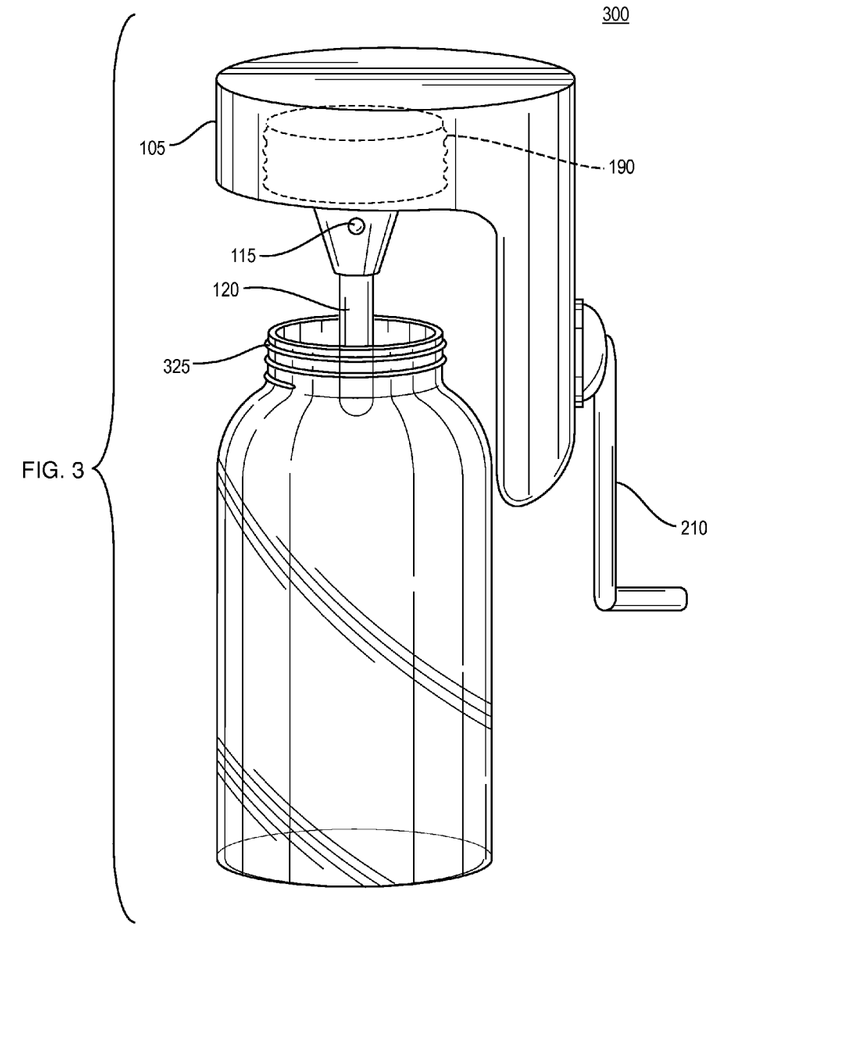

FIGS. 1-3 are schematic diagrams of an exemplary embodiment of a UV water purification system 100 that may be advantageously used with the present invention. The UV water purification system 100, assembled in housing 105, includes a UV lamp 120, lamp drive circuitry (not shown), an alternator 160, associated gears and extendable crank 110 that operate in a known manner and together form the dynamo, a microcontroller 130 (discussed further below), and conditioning circuitry (not shown) for the alternator output. The housing 105 also incorporates a threaded section 190 (illustrated by dotted lines) that surrounds the UV lamp 120 base and mates with a bottle aperture (mouth) 325, thereby allowing the lamp to be positioned within the water volume to be treated.

In the illustrative embodiments of the current invention, one or more sensors and/or switches are implemented in the circuitry of the above-described UV light purification system to prevent a user from operating the UV light when the lamp 120 is not in a container and/or water. One or both of a water sensor 115 and a pressure switch 125 may be illustratively incorporated into the UV water purification system 100 as a safety feature. For example, the pressure switch 125 may be a mechanical switch that operatively interconnects with the circuitry powering the UV Lamp 120, so that when the mouth of the bottle 325 is screwed into the threaded section 190, the switch is thereby compressed. The compression enables the circuit to be completed, and thus allows the UV lamp 120 to be powered "on." Additionally or in the alternative, a water sensor 115 may be implemented to detect the presence of water surrounding the UV lamp 120. The water sensor may be a conventional conductive sensor or it may be an optical sensor that employs a photo sensor and an LED. Once the water sensor indicates a sufficient level of water, the system completes the circuitry for the UV lamp, thereby allowing the UV lamp to be operated. Thus, the above described sensors and/or switches prevent unsafe UV exposure by preventing the UV lamp 120 from operating when the lamp is not sheltered by the container and/or water.

To ensure that the water within the container 201 is properly purified, the microcontroller 130, which is disposed within the detachable housing 105, may be is employed to track the UV lamp's "on" time as the dynamo is cranked by the user. "On" time is defined as the amount of time that the UV lamp 120 is operated at or above a minimum lamp intensity or is supplied a minimum lamp power, or current. In particular, once the dynamo is activated, the microcontroller 130 operates to, in turn, switch the UV lamp 120 "on" and initiate tracking the UV lamp operation to determine when a UV dose has been adequately administered. If the water sensor 115 and/or pressure switch 125 have been incorporated into the UV water purification system, the microcontroller 130 will require a sensor and/or switch signal before turning "on" the UV lamp 120 and initiating the dose. The microcontroller 130 then monitors the current being supplied by the dynamo, and through the lamp drive circuit, to the UV lamp 120. The supplied current, which is the lamp input power, is related to the speed at which the crank is turned during the dose time.

In order to ensure that UV light of at least a minimum intensity is being applied to the water for a sufficient amount of time, the microcontroller 130 does not, during the time that the current supplied to the lamp is below a minimum acceptable value, advance a count toward the required dose time. However, once the supplied current is above a minimum acceptable value, the microcontroller 130 advances the count toward the required dose time until a predetermined value has been reached. Thus, the dose time is power, or lamp intensity, dependent. That is, the time is lengthened by users who crank the dynamo more slowly. When the required dose time, or count is achieved, the microcontroller 130 shuts "off" the UV lamp 120 and optionally activates an indicator (e.g., an LED, LCD, buzzer, bell, etc.) to signal to the user that the UV lamp dose is complete.

If an adequate amount of current is not initially supplied to the UV lamp 120 by the user-operated dynamo, the UV lamp 120 remains "off" and the microcontroller 130 optionally activates one or more indicators (e.g., LED, LCD, buzzer, bell, etc.) to signal that the supplied current is below the minimally required value to operate the UV lamp 120. If, however, the user initially supplies an adequate amount of current to the UV lamp 120, but then slows down the crank speed thereby reducing the supplied current to a value below the minimum requirement, e.g., 13 mAmps, the microcontroller 130 may is then shut "off" the UV lamp 120 until the minimum amount of current is again supplied to the UV lamp 120. Alternatively, the microcontroller 130 may operate the UV lamp 120 while signaling that the current is below the minimally required value by activating an indicator which can be viewed by the user (e.g., an LED, LCD, buzzer, bell, etc.).

As discussed, once the adequate current is produced by the crank, the UV lamp 120 is turned back "on," as appropriate, and the dose time resumes from the last count recorded by the microcontroller 130. For example, if a user had previously operated the crank to supply an adequate amount of current to the UV lamp 120 for 5 minutes of an illustratively required 8 minute dose time, but then failed to produce the adequate current due to e.g., exhaustion or an interruption, the dose count remains at 5 minutes until the user is able to once again produce the adequate amount of current to be supplied to the lamp. The user is now only required to rotate the crank for an additional 3 minutes at a rate that produces the adequately supplied current to complete the required dose time rather than having to start the count over. If, however, the required dose period is not completed within a predetermined period of time, e.g., 8 seconds, the counter is reset to 0 until the dynamo once again supplies current to the UV lamp. Once the required dose time is complete, whether during a single period of time or over multiple periods of time, the microcontroller 130 shuts "off" the UV lamp 120 and optionally activates an indicator (e.g., an LED, LCD, buzzer, bell, etc.) to signal to the user that the UV lamp dose is complete.

During cranking, one or more LEDs can also be used to signal to the operator whether or not the crank is being turned at a rate that provides an adequate current to the UV lamp 120. During cranking that is too slow to provide sufficient current to the UV lamp 120, for example, a red LED may flash, to indicate to the user that more energy is required to purify the water. During cranking that is sufficiently fast to provide the adequate amount of current to the UV lamp 120, the exemplary red LED may be illuminated steadily to indicate to the user that the required amount of energy is being applied to purify the water. Once the UV lamp 120 has operated at or above a minimum intensity for a sufficient amount of time to meet the required dose period, the microcontroller 130 may then disable the UV lamp 120 and flash e.g., a green LED to is indicate a completed dose. Other visual or audio cues may be given instead or in addition, to indicate adequate and/or inadequate cranking speed.

As discussed above, the microcontroller 130 may employ a technique to determine whether a sufficient dosage has been administered to the water within the UV water purification system. In operation, when the crank is turned at a slower speed, the percentage of the required dose administered per unit time is lower. When the crank is turned at a faster speed, however, the percentage of the required dose administered per unit time is higher. As such, the variation in speed of the crank can change the accumulation time. To account for this, the microcontroller 130 summates the total percentage of the dose that has been completed by the UV water purification system by comparing the monitored current supplied to the lamp (or lamp input power and/or crank/dynamo speed) with a lookup table and assigning a percentage of the total dose per unit of time (e.g., second #1@10 mA=2% of dose, second #2@11.5 mA=2.5% of dose, second #3@12 mA=2.75%, etc.) to each second the microcontroller 130 counts as having administered sufficient UV light intensity. The microcontroller 130 keeps summating the total percentage of the dose administered, in the example: the sum of seconds 1 through 3 above total 7.25% of the required dose, until the summation equals 100% indicating that the required dose has been applied. Again, an indicator may be activated to notify the user that the required dose has been completed by e.g., LED, LCD, buzzer, bell, etc.

In addition to these modes of operation, the microcontroller 130 can be used to control current supplied to the lamp at a variety of crank speeds (above a minimum), so as to provide to the UV lamp 120 a constant level of current. This can be done by pulse width modulating (PWM) the power into the lamp drive circuit. If the crank speed is high, then the PWM duty cycle adjusts to reduce "on" time and therefore also reduce cranking effort. That is, an oscillator circuit may be enabled and disabled a proportionate amount of times by the microcontroller 130 when the dynamo is generating a smaller or larger current respectively. For example, when the user is rotating the crank faster, a larger current is being produced by the dynamo. As a result, the oscillator circuit may be disabled 20% of the time. In turn, during the 20% of the time that the oscillator circuit is disabled, a load is taken off the circuit thereby allowing the crank to be more easily rotated by the user. When the load on the circuit is thereafter increased during the "on" portion of the cycle, the user feels more resistance, thereby requiring a greater amount of effort to then rotate the crank. At the end of the "on" portion of the cycle, the load on the circuit is again reduced and so forth.

Figure 4:
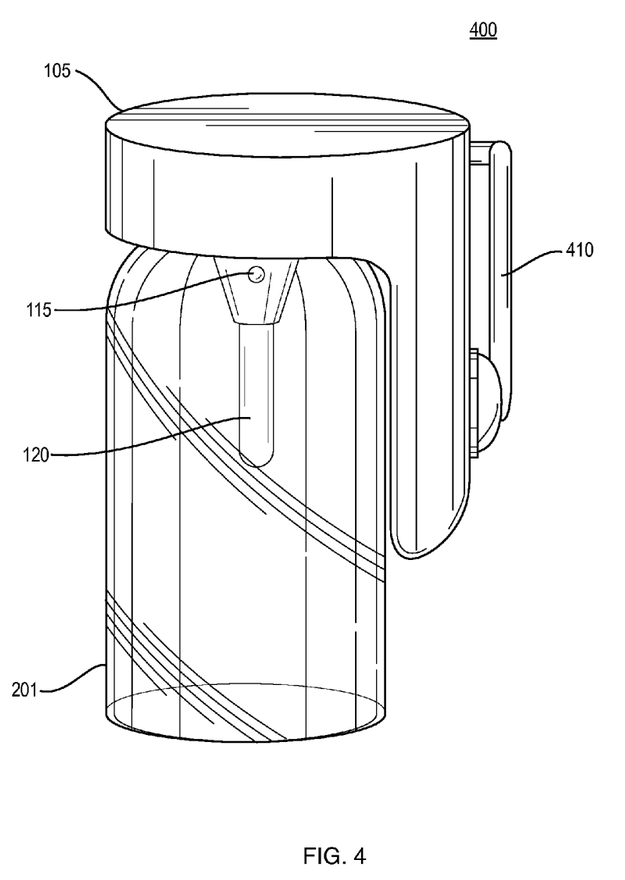

FIG. 4 is a schematic illustrative embodiment a UV water purification system wherein the rotatable crank may be stowed in housing 105. This allows the UV water purification system to be compact and easily stored when the UV water purification is not in use.

Figure 5:
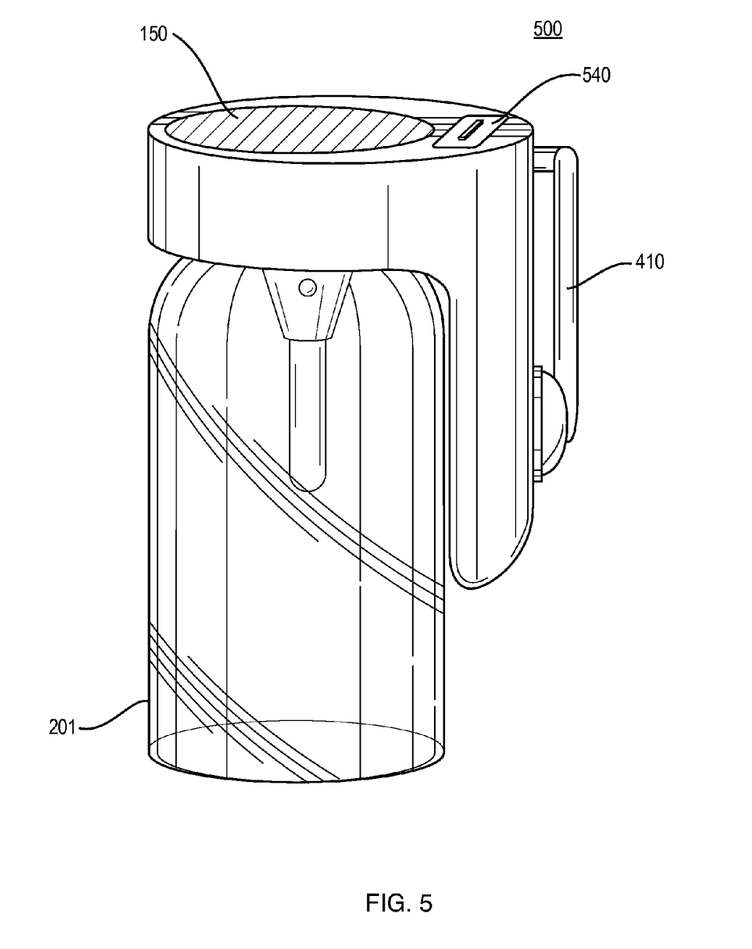

FIG. 5 is a schematic diagram of an exemplary UV water purification system securely attached to a container that may be advantageously used with the present invention. Although the current invention has been described with only the crank dynamo system as the source of power. The UV water purification system 100 may be operated by both the crank dynamo and one or more batteries 140 which may be accessed by an optional battery door 540. In this embodiment, the microcontroller 130 may be configured to also monitor battery voltage and provide power to the lamp with: pure crank power, pure battery power or a combination of battery and crank power. Furthermore, a small photovoltaic panel 150 and a rechargeable storage battery (not shown) may also be utilized as further alternate sources of power on the UV lamp 120. In this case, the crank dynamo and/or the photovoltaic panel may be used to charge the rechargeable batteries 140 rather than powering the UV lamp 120 itself. The rechargeable batteries may then be used to fully power the UV lamp circuitry. Additionally, the microcontroller 130 may be configured to direct power from the photovoltaic panel, the crank, and the battery in various proportions to the UV lamp 120. For example, 30% of the power may be obtained from the crank, 30% of the power from the photovoltaic panel, and 40% of the power obtained from the batteries to drive the UV lamp 120 to the required intensity for the dosage. Alternatively, the microcontroller may direct, for example, the batteries to recharge through the photovoltaic panel while the dynamo powers the UV lamp or vice versa. Accordingly, battery life is increased and the is required power produced by the user rotating the crank is decreased.

Figure 6:
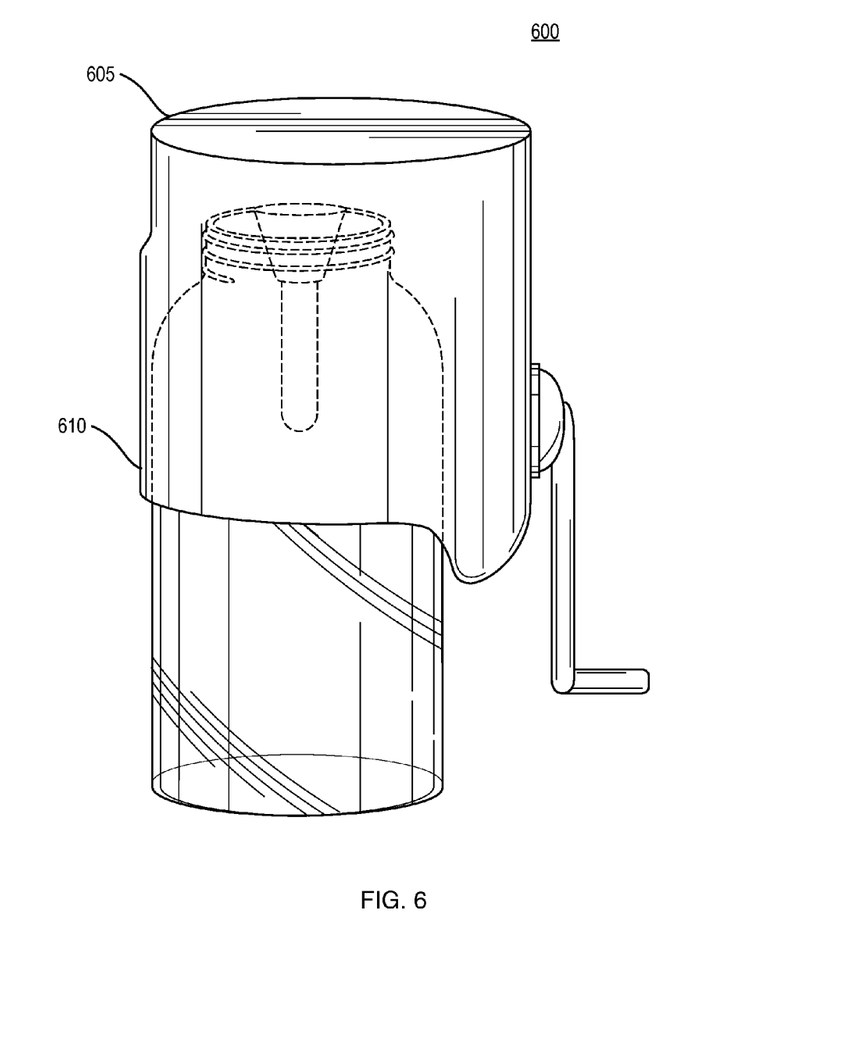
FIG. 6 is schematic diagram of an alternative exemplary housing for the UV water purification system that may be advantageously used with the present invention.

FIG. 6 illustrates an alternate housing 605 which may be utilized in combination with the current invention. A shroud 610 may be extended downwardly from the upper portion of housing 605 to provide protection to the UV lamp 120 when the system is removed from container and the UV lamp 120 is otherwise exposed. Additionally, the shroud 610 may also help prevent ambient light from reaching an optional optical water sensor 115, thereby preventing the ambient light from inaccurately triggering the water sensor.

Advantageously, the present invention provides the user with the many advantages of UV purification without the need for external power sources or disposable batteries. Such a system would be ideal for use in emergency situations (i.e. earthquakes, hurricanes, floods, etc.), developing countries and in wilderness areas where power grids are not functional or not in place.

As will be appreciated by those skilled in the art, the various compositions of the dynamo powered ultraviolet water purification system described above with reference to FIGS. 1-6 are exemplary only. Additional variations of the dynamo and crank assembly, the microcontroller, and/or ultraviolet lamp and associated sensors may be used without departing from the spirit and scope of the current invention. For instance, although, the above described technique for reducing the crank effort is described utilizing an oscillator circuit, other techniques may be applied in order to reduce the amount of cranking effort applied by the user, e.g., enabling and disabling the certain coils within the dynamo to thereby reduce magnetic resistance generated by the coils, etc. As such, the descriptions of specific materials and/or properties should be taken as exemplary only.

The invention claimed is:

1. An ultraviolet (UV) water purification system, comprising:
   a dynamo operatively connected to a rotatable crank to provide an electrical current to lamp drive circuitry in the UV water purification system, when the rotatable crank is actuated by a user around an axis of the rotatable crank;
   a UV lamp operatively interconnected to the lamp drive circuitry, the lamp drive circuitry providing drive current to the UV lamp in response to the electrical current produced by the dynamo, and the UV lamp producing UV light to purify water surrounding the UV lamp in response to the driving current; and a microcontroller operatively employed within the lamp drive circuitry between the dynamo and the UV lamp, the microcontroller configured to: (1) track both an on time and an intensity of the UV lamp to ensure an adequate dose of UV light is administered to the water surrounding the UV lamp, where the on time tracked by the microcontroller is an amount of time that the UV lamp is supplied the electric current above a predetermined minimum threshold required to produce a minimum intensity from the UV lamp, (2) increase a counter in response the electrical current being above the predetermined minimum threshold required to output the minimum intensity from the UV lamp, (3) pause the counter at a last count value when the electrical current drops below the predetermined minimum threshold required to output the minimum intensity from the UV lamp, (4) resume increasing the counter from the last count value when the electrical current is again above the predetermined minimum threshold required to output the minimum intensity from the UV lamp, where the counter is increased until a predetermined value has been reached, and (5) turn off the UV lamp in response to the counter reaching the predetermined value.

2. The UV water purification system of claim 1, further comprising one or both of a water sensor operatively connected to the lamp drive circuitry to prevent the UV lamp from being powered when the UV lamp is not surrounded by water and a pressure switch operatively connected to the lamp drive circuitry to prevent the UV lamp from being powered when a threaded section of the UV water purification system is not correctly screwed into a bottle.

3. The UV water purification system of claim 1, wherein the microcontroller is further configured to activate an indicator in response to the counter reaching the predetermined value, the indicator signaling to the user that a UV lamp dose is complete.

4. The UV water purification system of claim 1, wherein the microcontroller is further configured to activate an indicator in response to a determination by the microcontroller that the dynamo is not being cranked fast enough to produce the electrical current above the predetermined minimum threshold.

5. The UV water purification system of claim 4, wherein the indicator is a flashing LED, an audible cue or both.

6. The UV water purification system of claim 1, wherein the microcontroller is further configured to summate a total percentage of a dose that has been completed by the UV water purification system by comparing the electrical current supplied to the UV lamp with a lookup table and assigning a percentage of a total dose per unit of time to each unit of time over which the microcontroller determines the UV lamp has administered at least the minimum intensity from the UV lamp.

7. The UV water purification system of claim 1, wherein the microcontroller is further configured to control an amount of electrical current supplied to the UV lamp by pulse width modulating power supplied to the lamp drive circuitry from the dynamo.

8. The UV water purification system of claim 7, wherein the microcontroller is further configured to enable and disable an oscillator circuit a proportionate number of times per unit of time to decrease a load on the lamp drive circuitry wherein the proportionate number of times is determined based on a speed at which the user cranks the rotatable crank over the unit of time.

9. The UV water purification system of claim 8, wherein a resistance felt by the user when cranking the rotatable crank is reduced when the user cranks the rotatable crank faster and the resistance felt by the user is increased when the user cranks the rotatable crank more slowly.

10. The UV water purification system of claim 1, further comprising a housing that surrounds the dynamo, the lamp circuitry, the microcontroller and the UV lamp.

11. The UV water purification system of claim 10, wherein the housing further comprises a shroud.

12. The UV water purification system of claim 10 wherein the rotatable crank is extendable and is configured to be stowed in the housing when the rotatable crank is not in use.

13. The UV water purification system of claim 1, wherein the UV lamp is powered by the dynamo and either or both of one or more batteries and a photovoltaic cell.

14. The UV water purification system of claim 13, wherein the microcontroller is further configured to control sources of power for the UV lamp, with the dynamo providing a certain percentage of the power required to run the UV lamp and the one or more batteries alone or in combination with the photovoltaic cell providing a remaining percentage of the power required to run the UV lamp.

15. The UV water purification system of claim 13, wherein the one or more batteries are recharged by either or both of the photovoltaic cell and the dynamo.

16. The UV water purification system of claim 1, the UV lamp is surrounded by a shroud to provide protection to the UV lamp when a threaded portion of the UV water purification system is removed from a bottle.

17. A method for operating a ultraviolet (UV) water purification system, the method comprising:
actuating a rotatable crank around an axis of the rotatable crank to generate a current in an alternator, the alternator operatively connected to a lamp drive circuit within the UV water purification system, the alternator and the rotatable crank together forming a dynamo;
providing the current generated by the dynamo to a UV lamp operatively connected to the lamp drive circuit;
monitoring an on time and an intensity of the UV lamp to ensure an adequate dose of UV light is administered to water surrounding the UV lamp, where the on time monitored by a microcontroller is an amount of time that the UV lamp is supplied the current above a predetermined minimum threshold required to produce a minimum intensity from the UV lamp;
incrementing a counter in the microcontroller until a predetermined value has been reached, the counter incrementing every time unit that the current supplied to the UV lamp is over the predetermined minimum threshold, where the counter is paused at a last count value when the current supplied to the UV lamp drops below the predetermined minimum threshold and the incrementing of the counter is resumed from the last count value when the current supplied to the UV lamp is again over the predetermined minimum threshold; and
in response to the counter reaching the predetermined value, powering off the UV lamp.

18. The method of claim 17, the method further comprising determining whether the UV lamp is immersed in a required amount of water by a water sensor operatively connected to the lamp drive circuit to prevent the UV lamp from being powered when the UV lamp is not surrounded by water and a pressure switch operatively connected to the lamp drive circuit to prevent the UV lamp from being powered when the UV water purification system is not correctly screwed into a bottle.

19. The method of claim 17, wherein a resistance felt by the user when cranking the rotatable crank is reduced when the user cranks the rotatable crank faster and the resistance felt by the user is increased when the user cranks the rotatable crank more slowly.

20. An ultraviolet (UV) water purification system, comprising:
- a dynamo operatively connected to a rotatable crank to provide an electrical current to lamp drive circuitry in the UV water purification system, when the rotatable crank is actuated by a user around an axis of the rotatable crank;
- a UV lamp operatively interconnected to the lamp drive circuitry, the lamp drive circuitry providing drive current to the UV lamp in response to the electrical current produced by the dynamo, and the UV lamp producing UV light to purify water surrounding the UV lamp in response to the drive current; and
- a microcontroller operatively employed within the lamp drive circuitry between the dynamo and the UV lamp, the microcontroller configured to: (1) track both an on time and an intensity of the UV lamp to ensure an adequate dose of UV light is administered to the water surrounding the UV lamp, (2) start a counter when a threshold amount of the electrical current is reached to operate the UV lamp at or above a minimum intensity for purification, (3) increase the counter in response to the electrical current being at or above the threshold required to output the minimum intensity from the UV lamp for purification, where the counter is increased until a predetermined value has been reached, and (4) turn off the UV lamp in response to the counter reaching the predetermined value.

* * * * *

UNITED STATES PATENT AND TRADEMARK OFFICE
CERTIFICATE OF CORRECTION

| | | |
|---|---|---|
| PATENT NO. | : 9,150,433 B2 | Page 1 of 1 |
| APPLICATION NO. | : 12/986590 | |
| DATED | : October 6, 2015 | |
| INVENTOR(S) | : Miles Maiden et al. | |

It is certified that error appears in the above-identified patent and that said Letters Patent is hereby corrected as shown below:

In the Specification:
Col. 1, line 24 should read:
safe drinking water. According to a nonprofit group, Water.

Col. 1, line 60 should read:
cartridges that may clog if they become too full. Therefore, Col. 2, line 35 should read:
bottle. Beneficially, the attached dynamo may generate Col. 3, line 53 should read:
within the detachable housing 105, may be employed to Col. 4, line 29 should read:
troller 130 may then shut "off" the UV lamp 120 until the Col. 5, line 5 should read:
indicate a complete dose. Other visual or audio cues may Col. 6, line 20 should read:
and the required power produced by the user rotating the In the Claims:
Claim 12, Col. 8, line 9 should read:
12. The UV water purification system of claim 10, wherein Signed and Sealed this
First Day of March, 2016

Michelle K. Lee
*Director of the United States Patent and Trademark Office*